United States Patent [19]

Iwamura et al.

[11] Patent Number: 5,486,437
[45] Date of Patent: Jan. 23, 1996

[54] OPTICAL RECORDING METHOD

[75] Inventors: Takashi Iwamura; Yoko Matsuzawa; Shin-Ichiro Tamura, all of Kanagawa, Japan

[73] Assignee: Sony Corporation, Tokyo, Japan

[21] Appl. No.: 506,456

[22] Filed: Jul. 24, 1995

Related U.S. Application Data

[63] Continuation of Ser. No. 226,046, Apr. 11, 1994, abandoned.

[30] Foreign Application Priority Data

Apr. 8, 1993 [JP] Japan ..................... 5-082109

[51] Int. Cl.$^6$ ....................... G11B 7/00
[52] U.S. Cl. ............... 369/288; 430/945; 430/21; 430/270.16; 430/273.1; 430/275.1
[58] Field of Search ............... 430/945, 270, 430/495, 21, 271, 273, 275; 369/284, 288; 540/145

[56] References Cited

U.S. PATENT DOCUMENTS

| | | | |
|---|---|---|---|
| 4,360,908 | 11/1982 | Howe et al. | 369/109 |
| 4,380,769 | 4/1983 | Thomas et al. | 346/135.1 |
| 4,415,621 | 11/1983 | Specht et al. | 428/172 |
| 4,696,892 | 9/1987 | Abe et al. | 430/495 |
| 4,900,649 | 2/1990 | Mochizuki et al. | 430/311 |
| 5,080,946 | 1/1992 | Takagisi et al. | 428/64 |

FOREIGN PATENT DOCUMENTS

| | | | |
|---|---|---|---|
| 58-083345 | 5/1983 | Japan | 369/288 |
| 59-218634 | 12/1984 | Japan | |
| 1-151028 | 6/1989 | Japan | |
| 2-165423 | 6/1990 | Japan | |
| 2-187938 | 7/1990 | Japan | |
| 2-278519 | 11/1990 | Japan | |
| 4-271342 | 9/1992 | Japan | |
| 5-120727 | 5/1993 | Japan | |

Primary Examiner—Charles L. Bowers, Jr.
Assistant Examiner—John A. McPherson
Attorney, Agent, or Firm—Hill, Steadman & Simpson

[57] ABSTRACT

An optical recording medium wherein a recording layer capable of optically recording and reproducing the information is formed on a substrate, and wherein the information is recorded with a light beam having a wavelength shorter than that of a replay light beam. A film thickness d of the recording layer is set so as to satisfy the relation $d \leq 1.75\lambda/n$, where $\lambda$ is the wavelength of the replay light beam and n is the real part of the complex index of refraction of the recording layer with respect to the replay light beam. The real part of the complex index of refraction of the recording layer with respect to the replay light beam is not less than 2.55, while the absolute value of the imaginary part of the complex index of refraction of the recording layer with respect to the recording light beam is not less than 1.0. The organic dye may be enumerated by a cyanine compound and a porphyrin compound. If the porphyrin compound is used, blue-hued laser recording becomes possible. The optical recording medium is capable of non-destructive reading and superior in reliability and high-speed recording/reproducing characteristics.

4 Claims, 3 Drawing Sheets

OPTICAL RECORDING METHOD

This application is a continuation, of application Ser. No. 08/226,046, filed Apr. 11, 1994.

BACKGROUND OF THE INVENTION

This invention relates to an optical recording medium for optically recording and reproducing the information and, more particularly, to an improvement in the optical recording medium in which an organic dye is used as a recording material.

The optical recording medium for recording and reproducing the information based upon irradiation of a laser beam usually includes a recording layer of an optical recording material formed on a substrate. The recording of the information is by condensing the laser light on the recording layer for forming pits, while the reproduction of the information is by detecting the difference in reflectance between an area in which pits are formed and an area in which pits are not formed.

Such optical recording medium is attracting attention as a recording medium for storage of a large quantity of the information, since it is possible to render the track width narrower than that of the magnetic recording medium and hence the high-density recording becomes possible. For this reason, investigations are proceeding briskly for improving the volume of the recording information.

The red to infrared laser light is generally employed for recording/reproducing the information on the optical recording medium, and a recording medium adapted therefor has become popular. Also the disc-shaped recording medium allowing data recording by the user, such as CD write-once or CDWO, has made its debut.

Meanwhile, in the CDWO, the recording laser light beam has a wavelength equal to that of the replay laser light beam. However, if reproduction is continued for a prolonged time, there is the risk of destruction of the recording pits by the replay laser beam or optical deterioration of the material of the recording layer.

In addition, such recording medium is low in sensitivity and is not suited for high-speed recording/reproduction.

If, in the case of a recording medium in which the laser light beam of the red to infrared region is used for recording/reproduction, so-called ultra-resolution or the like technique is required for increasing the volume of the information recorded per unit area of the recording medium.

SUMMARY OF THE INVENTION

It is therefore an object of the present invention to provide an optical recording medium which is superior in sensitivity and high-speed recording/reproduction and in which it is possible to effect non-destructive reading with high reliability.

For accomplishing the above object, then optical recording medium according to the present invention is so arranged that a recording layer capable of optically recording and reproducing the information is formed on a substrate, and the information is recorded with a light beam having a wavelength shorter than that of a replay light beam.

Since the recording is made on the optical recording medium of the present invention with the light beam having a wavelength shorter than that of the replay light beam, there is no risk of pit destruction due to absorption of the replay light or deterioration of the optical playback properties of the recording material due to generation of radicals, so that the playback characteristics are not deteriorated on repeated reproduction.

Above all, the recording/reproducing characteristics with the modulation factor of not less than 0.6 may be achieved by setting the optical constants or film thicknesses of the recording layer composed mainly of the organic dye. In addition, the optical recording medium of the present invention exhibits superior light absorbing characteristics and high sensitivity and is capable of high-speed recording/reproduction so that double-rate recording becomes possible with the above-mentioned CDWO.

Further more, high-density recording with the blue-hued laser may be achieved by suitably selecting the organic dye such that a higher recording density may be achieved in combination with ultra-resolution.

DETAILED DESCRIPTION OF THE PREFERRED EMBODIMENT

Figure 1:
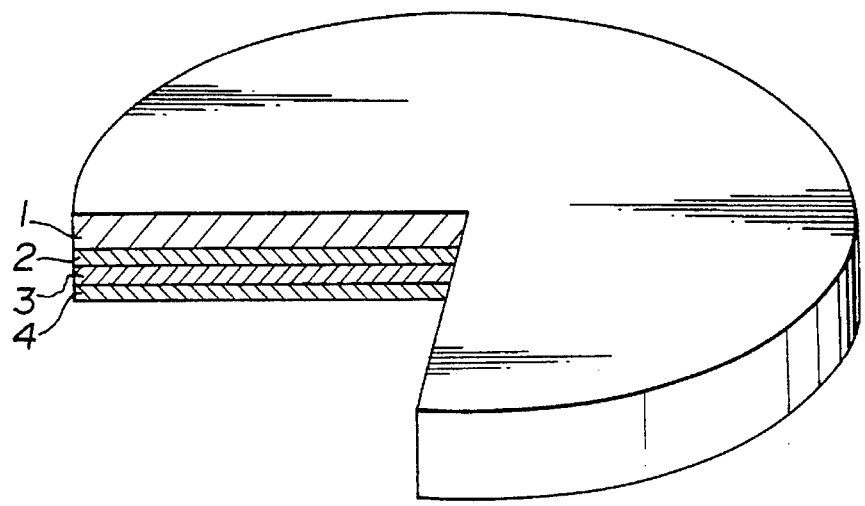
FIG. 1 is a schematic perspective view showing an optical recording medium according to the present invention, with a portion thereof being broken away.

The present inventors have conducted eager researches towards achieving the above object, and found that the readout destruction caused by repeated reproduction is ascribable to the absorption of the replay light by the recording layer and that light deterioration of the material of the recording layer is ascribable to radicals produced due to absorption of the replay light by the recording layer.

The present invention, completed on the basis of the above finding, resides in that a recording layer capable of optical recording and reproduction of the information is formed on a substrate, and in that the information is recorded using the light having a wavelength shorter than the wavelength of the replay light.

Our experiments have also revealed that, if recording is made using the light having the wavelength shorter than the wavelength of the replay light, the modulation factor is not changed during the playback to prevent the readout destruction by suppressing the absolute value of the imaginary part of the complex index of refraction in the playback light wavelength of the recording layer. It has also been found that optimum modulation characteristics may be achieved by setting the imaginary part of the complex index of refraction in the recording light wavelength and the real part of the complex index of refraction in the replay light wavelength in respective optimum ranges.

It is therefore desirable in the optical recording medium of the present invention to set the optical constants of the recording layer within an optimum range. That is, in the first place, the real part of the complex index of refraction in the replay light wavelength for the recording layer is set so as to be 2.55 or higher. Second, the absolute value of the imaginary part of the complex index of refraction in the replay light wavelength for the recording layer is set so as to be 0.1 or lower. Third, the absolute value of the imaginary part of the complex index of refraction in the recording light wavelength for the recording layer is set so as to be 1.0 or higher.

Also, with the optical recording medium of the present invention, the thickness of the recording layer plays an important role. That is, by setting the thickness of the recording layer so as to be not more than a certain value, the modulation factor may be in excess of 0.6. Specifically, the modulation factor of 0.6 or higher may be achieved when the number of periods of the replay light located in the thickness of the recording layer ρ, referred to herein as number of waves for convenience sake, is 1.75 or less. It is therefore desirable to set the film thickness d of the recording layer so as to be within the range of $d \leq 1.75\lambda/n$, where n is the real part of the complex index of refraction in the replay light wavelength of the recording layer. That is, a recording layer 2 and a reflective layer 3 are formed in this order on a substrate 1, and a protective layer 4 is further formed on the reflective layer 3.

There is no particular limitation to the materials of the recording layer, provided that the above conditions are satisfied. However, an organic material, above all, an organic material mainly composed of organic dyes, is preferred.

There is no particular limitation to the organic dyes contained in the recording layer in the present invention, provided that the above conditions are satisfied. These dyes may include, for example, cyanine dyes, phthalocyanine dyes, naphthacyanine dyes and porphyrin dyes.

Examples of the dyes include cyanine compounds represented by the formula (4)

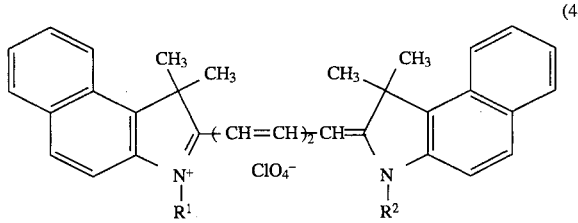

(4)

where $R^1$ and $R^2$ represent alkyl groups, preferably alkyl groups having 1 to 4 carbon atoms, and more preferably a propyl group, and porphyrin compounds represented by the formula (5)

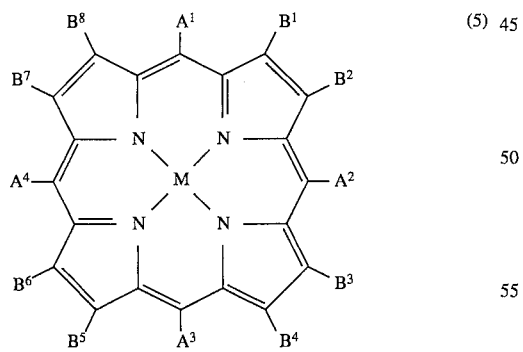

(5)

where $A^1$ to $A^4$ and $B^1$ to $B^8$ indicate hydrogen, phenyl group, alkyl group or hydrocarbon compounds containing cyclo rings. Alternatively, $B^n$ to $B^{n+1}$ n being 1, 3, 5 or 7, may be linked with $C_6H_4$ in a ring form. M denotes two to four protons or a metal atom, such as an atom of Zn, Mg, Al, Mn, Cu, Fe, Co or Ru. Such metal atom may include one or two axial ligands in a direction orthogonal to the plane of the porphyrin molecule.

Of the porphyrin compounds, tetraphenyl tetrabenzene, represented by the formula (6)

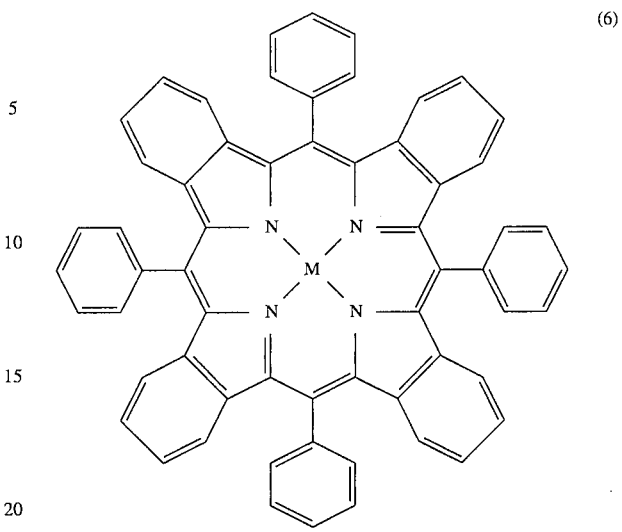

(6)

which is the above-defined porphyrin compound where $A^1$ to $A^4$ represent a phenyl group and $B^n$ to $B^{n+1}$, n being 1, 3 5 or 7 are bonded with $C_4H_4$ in a ring form, is most preferred.

The porphyrin compound having the formula (5) exhibits strong and acute absorption (Soret band) in a wavelength region of 400 to 500 nm, as disclosed in Inorganica Chemica Acta, 182, pp. 83 to 86 (1991). However, there lacks up to now a report on an optical recording medium making use of the absorption band. The present inventors have conducted eager searches and acquired the information that the Soret band of the porphyrin compound is useful for recording the blue-hued light.

Thus the optical recording medium making use of the porphyrin compound shown by the formula (5) as the organic dye is destined for blue color recording capable of high-density recording.

On the other hand, any substrate used in an ordinary recording medium may be used as a substrate according to the present invention. Examples of the substrate include glass, polycarbonate (PC) or polyethylene terephthalate (PET) substrates may be employed.

There is also no limitation to the reflective layer and any substrate employed for usual optical recording medium may be employed. Examples of the reflective layer include an aluminum deposited film or a gold deposited film.

The optical recording medium of the present invention may be provided with a lubricating layer and a protective layer for improving running characteristics, weatherability, resistance to chemicals or resistance to abrasion.

EXAMPLES

The present invention will be explained further with reference to Examples based upon the results of experiments. These Examples are merely illustrative and are not intended for limiting the invention.

EXPERIMENT 1: Investigations into Optical Constants

EXAMPLE 1

The cyanine compound represented by the formula (4), where $R^1$ and $R^2$ are propyl groups, was applied as a recording layer.

The complex index of refraction of the cyanine compound at the wavelength of 780 nm, as measured with a recording spectrophotometer manufactured by HITACHI KEISOKUKI CO. LTD. under the trade name of U-3210, was found to be 2.55–0.10i.

The complex index of refraction was measured at the above-mentioned wavelength of 680 nm. It was found that the real part could not be measured and the real part was equal to −1.00i. Since the cyanine compound was used by itself as a recording layer, these optical constants correspond to the optical constants of the recording layer.

3 g of the cyanine Compound were thoroughly dissolved in 100 g of 3-hydroxy-3-methyl-2-butanone using an ultrasonic washing device.

The resulting solution was spin-coated on a polycarbonate substrate at 2500 rpm to form a thin film having a thickness of 140 nm. Gold was then vacuum-deposited as a reflective layer on the thin film to a thickness of approximately 60 nm.

The UV-curable resin, manufactured by DAINIPPON INK KAGAKU CO. LTD. under the trade name of SD-17, was then spin-coated at once at 1800 rpm and cured on irradiation with a light from a 2 kW mercury lamp to give a desired optical recording medium.

On the produced optical recording medium, double-rate signals of the EFM signals according to the CD standard were recorded at a double rate of the recording rate for CD, using a semiconductor laser having a wavelength of 880 nm, at a recording power of 8 mW.

The optical recording medium, now carrying the recorded information, was reproduced using a compact disc reproducing apparatus. It was found that the modulation factor was equal to 0.61, thus satisfying the standard for CD. There was no change noticed in the modulation factor when the same area was continuously reproduced for 10 hours.

EXAMPLE 2

A zinc-tetraphenyl tetrabenzo porphine complex, which is the compound shown by the formula (6) where M is Zn, was used as a recording layer. The complex index of refraction of the zinc-tetraphenyl tetrabenzo porphine complex at the wavelength of 532 nm was measured and found to be 3.69–0.03 i. The complex index of refraction at the wavelength of 488 nm was also measured. It was found that the real part was not measurable and the imaginary part was equal to −1.98 i. Since the zinc-tetraphenyl tetrabenzo porphine complex was used by itself as a recording layer, these optical constants correspond to the optical constants of the recording layer.

0.3 g of the zinc-tetraphenyl tetrabenzo porphine complex was sufficiently dissolved in 5 ml of chloroform and undissolved components were filtered by a polytetrafluoroethylene (PTFE) filter.

The resulting saturated solution was diluted with chloroform to a concentration of ¾ and spin-coated on a glass substrate at 2500 rpm to produce a thin film having a film thickness of 110nm.

The resulting thin film was dried under vacuum at room temperature for about 20 hours by a vacuum drier to form a recording layer. An aluminum reflective film was then deposited on the thin film (recording layer) under vacuum to a thickness of approximately 70 nm.

The UV-curable resin, manufactured by DAINIPPON INK KAGAKU CO. LTD. under the trade name of SD-17, was then spin-coated at once at 1600 rpm and cured by irradiation with a light from a 2 kW mercury lamp to give a desired optical recording medium.

Pits were then recorded on the resulting optical recording medium, using an argon ion laser.

Figure 4:
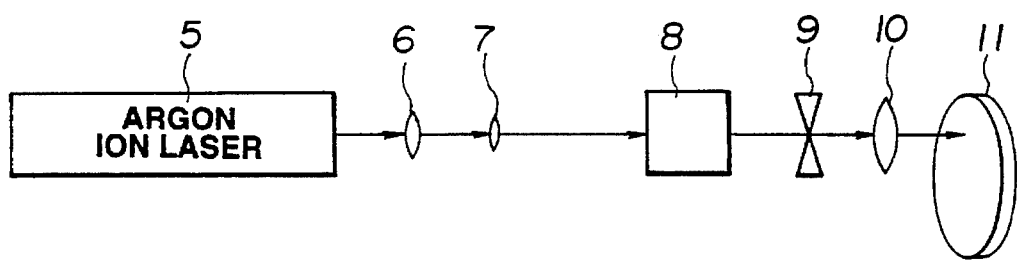
FIG. 4 is a schematic view showing a pit recording device.

For pit recording, a pit recording device shown in FIG. 4 was used. The pit recording device includes an argon laser 5, convex lenses 6 and 7, an acousto-optical modulator (AOM) 8, a diaphragm 9 and an objective lens 10. The laser beam was radiated to the substrate side of the optical recording medium 11.

In the pit recording device, a laser manufactured by LEXEL INC. under the trade name of model 95-4 (CW 488 nm, 1.3 μmφ in diameter) was used as the argon ion laser 5. Also the laser beam was reduced in diameter to 70 μmφ by the convex lenses 6 and and modulated to a pulse wave of 50 nsec using an acousto-optical modulator manufactured by CRYSTAL TECHNOLOGY INC. under the trade name of model 3200-120. The laser beam was radiated at the substrate side onto the sample surface. The laser beam was conducted via the diaphragm 9 and the objective lens 10 so that the laser beam was of the diameter of 0.6 μmφ and of the power of 10 mW on the reflective surface of the optical recording medium 11.

The modulation factor was measured using a reflection spectrum measurement mode of a microscopic spectrophotometer manufactured by HITACHI KEISOKUKI CO. LTD. under the trade name of model U-6500. The spot diameter was found to be 1 μmφ.

The reflectance of the sample for the wavelength of 532 nm before irradiation of the argon ion laser was 73% R, while that after the irradiation was 26% R. The modulation factor was 0.64.

The sample thus irradiated with the argon ion laser was further irradiated continuously with a YAG laser of CW at 1 mW for about 30 minutes. There was no change noticed in the reflectance at the wavelength of 532 nm.

EXAMPLE 3

Tetraphenyl tetrabenzo porphine shown by the formula (6), where M in the formula is two Hs, was used for the recording layer. The complex index of refraction of the dye, as measured at a wavelength of 488 nm, was 3.83–0.05 i. The complex index of refraction at a wavelength of 488 nm, was also measured. It was found that the real part was not measurable, while the imaginary part amounted to −1.65 i. Using this dye, an optical recording medium was produced in the same way as in Example 2. The film thickness of the recording layer was 91 nm.

Using the optical recording medium, a pit recording test was carried out in the same way as in Example 2. The reflectance at the wavelength of 532 nm before and after irradiation with the argon ion laser were 71% R and 25% R, respectively. The modulation factor was 0.65.

The sample thus irradiated with the argon ion laser was further irradiated continuously with a YAG laser of CW at 1mW for about 30 minutes. There was no change noticed in the reflectance at the wavelength of 532 nm.

Comparative Example 1

The cyanine compound similar to that used in Example 1, that is the compound shown by the formula (4) was mixed with a singlet oxygen deactivator manufactured by NIPPON KAYAKU CO. LTD. under the trade name of RG-003 at a mixing ratio of 10:2 so as to be used for the recording layer. The film thickness of the recording layer was 120 nm.

The complex index of refraction of the recording layer, as measured at a wavelength of 780 nm, was 2.48–0.08 i. The complex index of refraction at a wavelength of 680 nm, was also measured. It was found that the real part was not measurable, while the imaginary part amounted to −0.95 i. The sample was prepared in the same way as in Example 1 and recording/reproduction was carried out. It was found that the modulation factor amounted to 0.52. and the playback signals failed to meet the CD standard. The same region was continuously reproduced for 10 hours. It was found that no changes were noticed in the modulation factor.

Comparative Example 2

Thioflavine T shown by the formula (7)

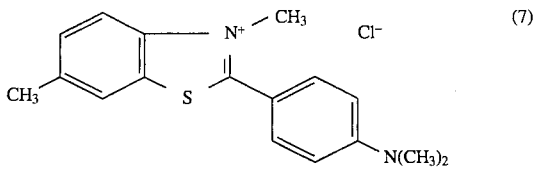

was used for the recording layer. The complex index of refraction of the for the wavelengths of 532 nm and 488 nm were 2.18–0.00 i and 2.18–0.14 i, respectively. A sample was prepared in the same way as in Example 2 to produce a recording medium having a film thickness of 75 nm.

A pit recording test similar to that of Example 2 was carried out on the recording medium. The reflectance at the wavelength of 532 nm before and after irradiation with the argon ion laser were 85% R and 82% R, respectively. The modulation factor was 0.04, thus indication that modulation was substantially not produced.

The sample thus irradiated with the argon ion laser was further irradiated continuously with a YAG laser of CW at 1 mW for about 30 minutes. There was no change noticed in the reflectance at the wavelength of 532 nm.

Comparative Example 3

A cyanine dye shown by the formula (8):

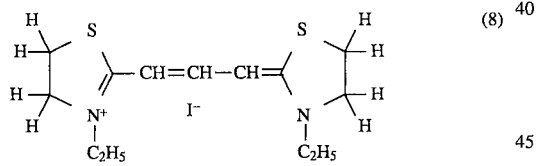

manufactured by NIPPON KANSHOKU SHIKISO CO. LTD. under the trade name of NK-1045, was used as the recording layer. The complex index of refraction of the recording layer for the wavelengths of 532 nm and 488 nm were 3.20–0.00 i and −0.95 i for the imaginary part, respectively. A sample was prepared in the same way as in Example 2 to produce a recording medium having a film thickness of 120 nm.

A pit recording test similar to that of Example 2 was carried out on the recording medium. The reflectance at the wavelength of 532 nm before and after irradiation with the argon ion laser were 73% R and 33% R, respectively. The modulation factor was 0.55.

The sample thus irradiated with the argon ion laser was further irradiated continuously with a YAG laser of CW at 1 mW for about 30 minutes. There was no change noticed in the reflectance at the wavelength of 532 nm.

Comparative Example 4

A styryl dye represented by the formula (9):

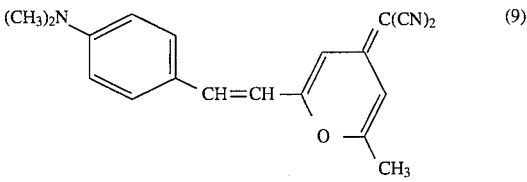

manufactured by NIPPON KANSHOKU SHIKISO CO. LTD. under the trade name of NK-1045, was used as the recording layer. The complex index of refraction of the recording layer for the wavelengths of 532 nm and 488 nm were 2.68–0.18 i and −1.84 i for the imaginary part, respectively. A sample was prepared in the same way as in Example 2 to produce a recording medium having a film thickness of 100 nm.

A pit recording test similar to that of Example 2 was carried out on the recording medium. The reflectance at the wavelength of 532 nm before and after irradiation with the argon ion laser were 71% R and 28% R, respectively. The modulation factor was 0.61.

The sample thus irradiated with the argon ion laser was further irradiated continuously with a YAG laser of CW at 1 mW for about 30 minutes. The reflectance at the wavelength of 532 nm of an area not irradiated with the argon laser and that of an area irradiated with the argon laser were 62% R and 28% respectively, while the modulation factor was lowered to a value lesser than 0.60, that is 0.55.

Comparative Example 5

A styryl dye represented by the formula (10):

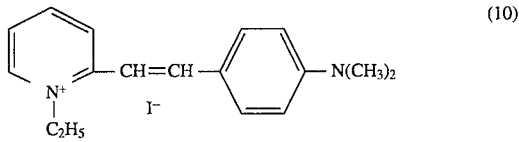

manufactured by NIPPON KANSHOKU SHIKISO CO. LTD. under the trade name of NK-557, was used as the recording layer. The complex index of refraction of the recording layer for the wavelengths of 532 nm and 488 nm were 2.25–0.14 i and −1.34 i for the imaginary part, respectively. A sample was prepared in the same way as in Example 2 to produce a recording medium having a film thickness of 93 nm.

A pit recording test similar to that of Example 2 was carried out on the recording medium. The reflectance at the wavelength of 532 nm before and after irradiation with the argon ion laser were 73% R and 32% R, respectively. The modulation factor was 0.58.

The sample thus irradiated with the argon ion laser was further irradiated continuously with a YAG laser of CW at 1 mW for about 30 minutes. The reflectance at the wavelength of 532 nm of an area not irradiated with the argon laser and that of an area irradiated with the argon laser were 68% R and 32% R, respectively, while the modulation factor was lowered to a smaller value of 0.53.

The above test results are summarized in Table 1. Also the test results are illustrated in FIGS. 2 and 3 in relation to the optical constants and the modulation factors.

TABLE 1

|  | recording light wavelength | replay light wavelength | modulation factor | change in modulation factor by reproducing |
|---|---|---|---|---|
| Ex. 1 | 680 nm | 780 nm | 0.61 | 0 |
| Ex. 2 | 488 nm | 532 nm | 0.64 | 0 |
| Ex. 3 | 488 nm | 532 nm | 0.65 | 0 |
| Comp. Ex. 1 | 680 nm | 780 nm | 0.50 | 0 |
| Comp. Ex. 2 | 488 nm | 532 nm | 0.04 | 0 |
| Comp. Ex. 3 | 488 nm | 532 nm | 0.55 | 0 |
| Comp. Ex. 4 | 488 nm | 532 nm | 0.61 | -0.06 |
| Comp. Ex. 5 | 488 nm | 532 nm | 0.58 | -0.05 |

Figure 2:
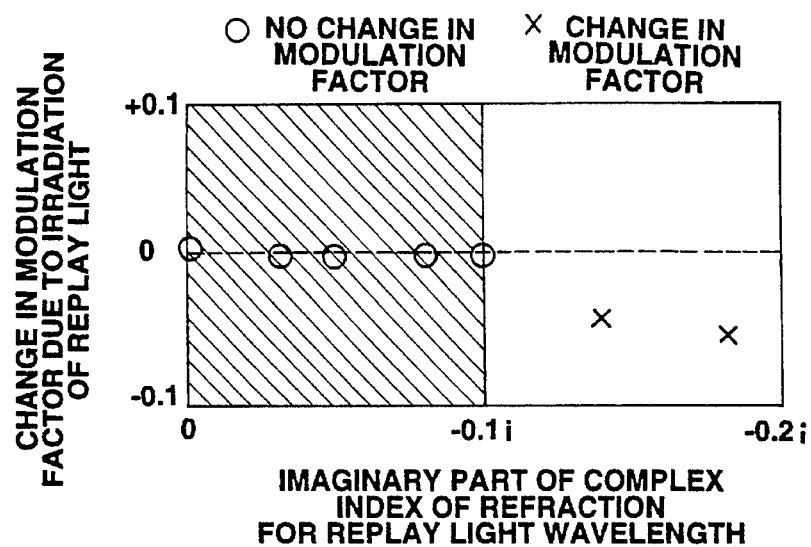
FIG. 2 is a graph showing changes in the modulation factor due to the difference in the imaginary part of the complex index of refraction in the playback light wavelength.
Figure 3:
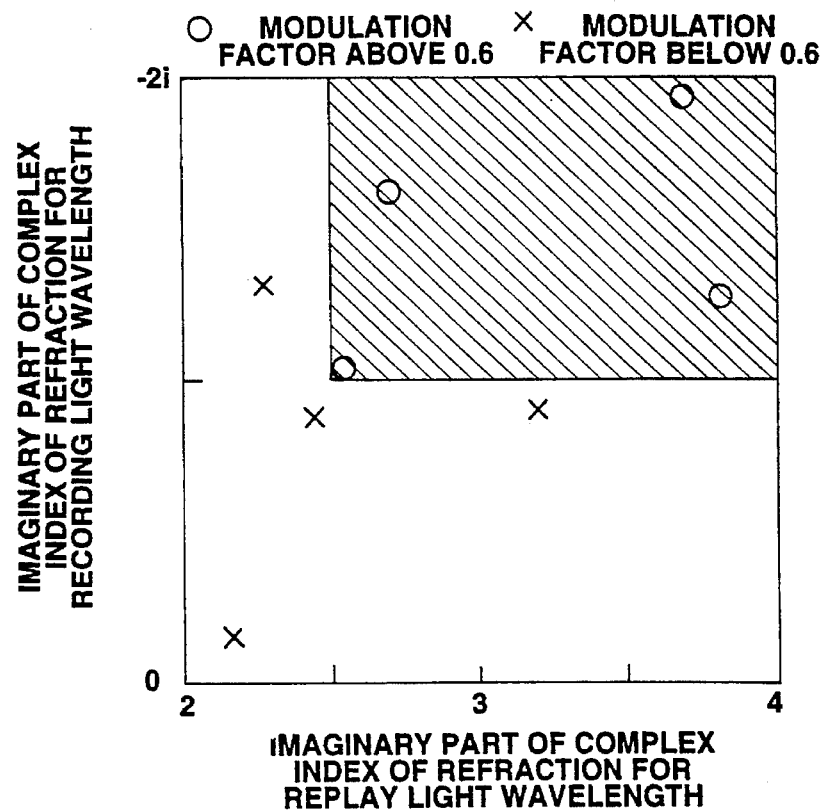
FIG. 3 is a graph showing the difference in the modulation factor due to the difference the real part of the complex index of refraction in the reproduction light wavelength and the imaginary part of the complex index of refraction in the recording light wavelength.

In FIGS. 2 and 3, the areas shown by hatched lines indicate the areas defined by the present invention. By properly setting the values of the real and imaginary parts of the complex index of refraction and the value of the imaginary part of the complex index of refraction, the high modulation factor may be assured. Also, the information may be recorded satisfactorily even when the replay light wavelength differs from the recording light wavelength.

Experiment 2: Investigations into Film Thickness of Recording Layer

EXAMPLE 4

In the present Example 4, similarly to the previous Example 2, the zinc tetraphenyl tetrabenzo porphine complex shown by the formula (6) was used in the recording layer.

0.3 g of the zinc-tetraphenyl tetrabenzo porphine complex were sufficiently dissolved in 5 ml of chloroform and undissolved components are filtered by a Polytetrafluoroethylene (PTFE) filter.

The resulting saturated solution was diluted with chloroform to a volumetric ratio of 0.90 and spin-coated on a glass substrate at 1000 rpm for 30 seconds. The produced film, as the recording layer, was partially scraped off with a cutter knife and the step difference produced thereat was measured at five positions using a cat whisker type film thickness meter, manufactured by TOKYO INSTRUMENTS CO. LTD. under the trade name of a-STEP. The film thickness was found to be 252.8±5.4 nm.

The produced thin film was dried in vacuum at room temperature for about 20 hours using a vacuum drier and an aluminum reflective film was deposited under vacuum on the thin film to a thickness of approximately 70 nm.

The UV-curable resin, manufactured by DAINIPPON INK KAGAKU CO. LTD. under the trade name of SD-17, was then spin-coated at once at 1600 rpm and cured by irradiation with a light from a 2 kW mercury lamp to give a desired optical recording medium.

Pits were then recorded on the produced optical recording medium, using the recording device as shown in FIG. 4, as in the previous Example 2.

The modulation factor was measured with the aid of a microscope spectrophotometer as in the previous Example 2. It was found that the reflectance at 532 nm of the sample before irradiation of the argon ion laser was 70.0% R, and that after the irradiation was 27.9% R. The modulation factor was 0.60.

EXAMPLES 5 to 21 and

Comparative Examples 6 and 7

Optical recording media were produced in the same way as in Example 4. However, the dilution ratio of zinc tetraphenyl tetrabenzo porphine and the rpm of the solution during the spin coating were set as shown in Table 2.

The film thicknesses of the produced optical recording media, the reflectance before and after laser irradiation and the modulation factor are also shown in Table 2.

TABLE 2

| No | dilution ratio | rpm during spin coating | film thickness nm | reflectance before laser irradiation | reflectance after laser irradiation | wavelength | modulation factor |
|---|---|---|---|---|---|---|---|
| Ex. 4 | 0.90 | 1000 | 252.8 ± 5.4 | 70.7 | 27.9 | 1.75 | 0.60 |
| Ex. 5 | 0.85 | 1000 | 197.5 ± 3.1 | 79.7 | 28.8 | 1.37 | 0.64 |
| Ex. 6 | 0.80 | 1000 | 139.5 ± 1.4 | 90.1 | 33.9 | 0.97 | 0.62 |
| Ex. 7 | 0.80 | 2500 | 125.0 ± 1.6 | 80.2 | 28.3 | 0.87 | 0.65 |
| Ex. 8 | 0.75 | 2500 | 110.3 ± 1.8 | 73.0 | 26.3 | 0.77 | 0.64 |
| Ex. 9 | 0.70 | 2500 | 108.8 ± 2.9 | 71.1 | 26.3 | 0.75 | 0.63 |
| Ex. 10 | 0.65 | 2500 | 96.2 ± 1.6 | 78.8 | 26.0 | 0.67 | 0.67 |
| Ex. 11 | 0.60 | 2500 | 92.3 ± 1.6 | 82.3 | 28.0 | 0.64 | 0.66 |
| Ex. 12 | 0.55 | 2500 | 85.9 ± 1.0 | 87.5 | 33.2 | 0.60 | 0.62 |
| Ex. 13 | 0.50 | 2500 | 79.0 ± 0.9 | 90.4 | 34.8 | 0.55 | 0.62 |
| Ex. 14 | 0.45 | 2500 | 75.6 ± 1.8 | 90.2 | 35.0 | 0.52 | 0.61 |
| Ex. 15 | 0.40 | 2500 | 67.6 ± 1.5 | 91.0 | 35.8 | 0.47 | 0.61 |
| Ex. 16 | 0.35 | 2500 | 61.2 ± 2.2 | 86.5 | 30.1 | 0.42 | 0.65 |
| Ex. 17 | 0.30 | 2500 | 55.8 ± 2.5 | 83.1 | 29.2 | 0.39 | 0.65 |
| Ex. 18 | 0.25 | 2500 | 47.9 ± 3.0 | 76.4 | 26.3 | 0.33 | 0.66 |
| Ex. 19 | 0.20 | 2500 | 40.3 ± 2.1 | 72.1 | 26.5 | 0.28 | 0.63 |
| Ex. 20 | 0.15 | 2500 | 33.4 ± 1.1 | 72.0 | 26.2 | 0.23 | 0.64 |
| Ex. 21 | 0.10 | 2500 | 25.9 ± 2.7 | 77.1 | 28.3 | 0.18 | 0.63 |
| Comp. Ex. 6 | 0.95 | 1000 | 299.4 ± 15.2 | 83.7 | 38.3 | 2.07 | 0.54 |
| Comp. Ex. 7 | 1.00 | 1000 | 361.1 ± 38.4 | 69.9 | 33.8 | 2.50 | 0.52 |

Figure 5:
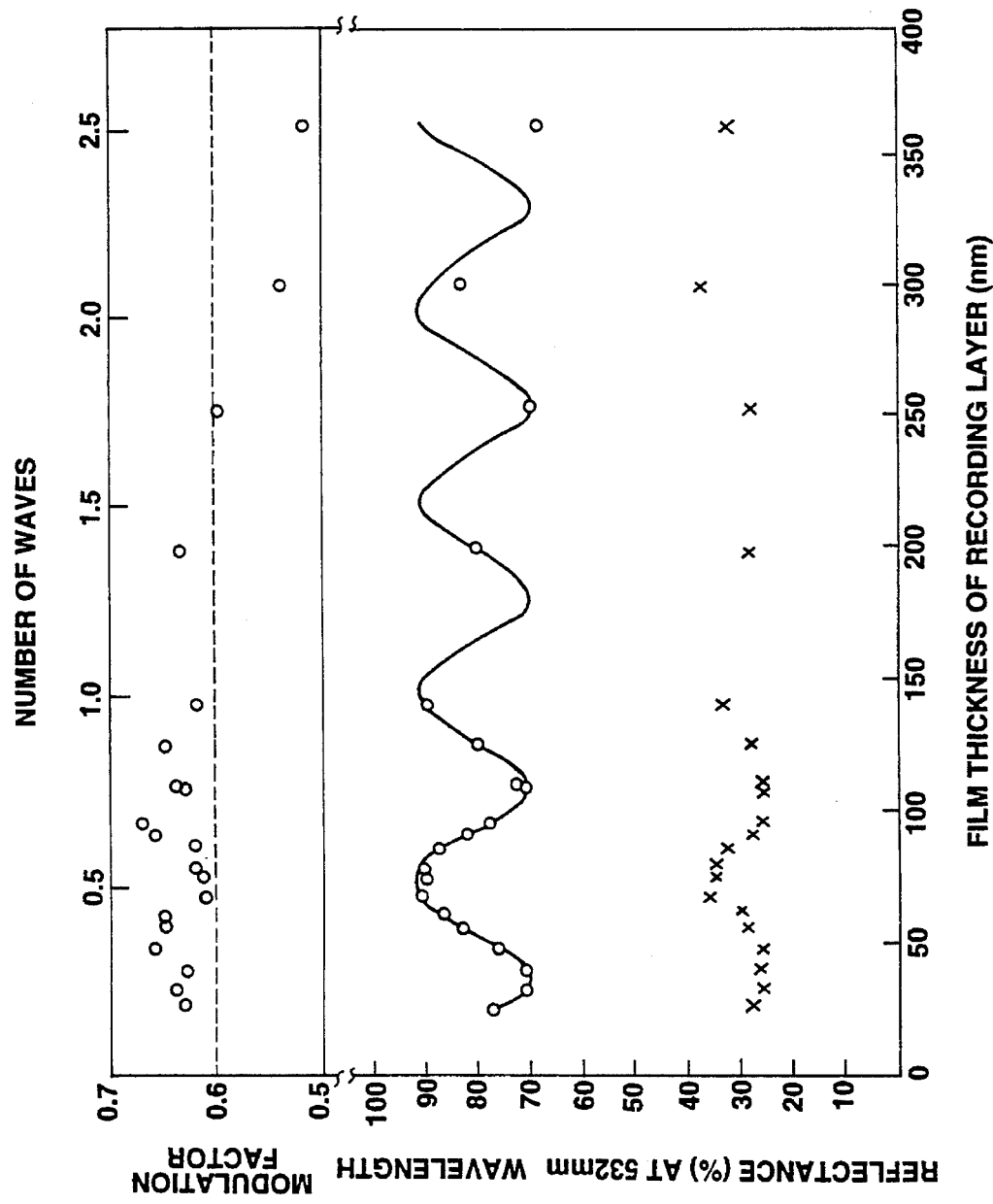
FIG. 5 is a graph showing the relation between the film thickness, reflectance and the modulation factor of the recording layer.

The data shown in Table 2 are illustrated in the graph of FIG. 5. It may be seen from Table 2 and FIG. 5 that the modulation factor depends on the film thickness. Above all, it may be seen that, by setting the film thickness so that the period of the wave of the replay light incident on the recording layer along the film thickness is 1.75 or less, that is the number of waves ρ is 1.75 or less, a high modulation factor may be achieved, and that the modulation factor tends to be lower if the film thickness is set to a value in excess of the above value.

Consequently, by setting the film thickness so that the number of waves ρ will be 1.75 or less, that is that the film thickness will be 1.75 $\lambda/n$, $\lambda$ being the replay light wavelength, satisfactory recording of the information signals at the modulation factor of 0.6 or higher may be achieved.

It is seen from above that, since the wavelength of the recording light differs from that of the replay light, it becomes possible to provide an optical recording medium which is not deteriorated in playback characteristics on repeated reproduction.

Also, by setting the optical constants and the film thicknesses of the recording layer composed mainly of organic dyes, recording/reproducing characteristics with the modulation factor of 0.60 or higher may be achieved, so that it becomes possible to provide an optical recording medium which is capable of performing recording/reproduction at a high speed and with high sensitivity.

What is claimed is:

1. A method for high speed/high density recording of information on an optical recording medium and for high reliability, nondestructive playback of the recorded information therefrom, comprising the steps of:

providing an optical recording medium including a substrate having an optical recording layer thereon, the optical recording layer comprising an organic porphyrin dye having the formula:

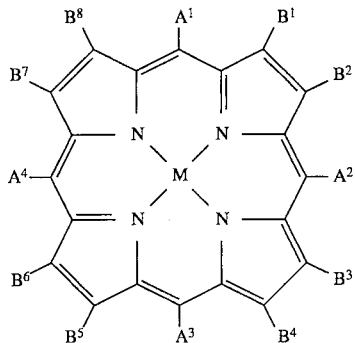

where $A^1$ to $A^4$ and $B^1$ to $B^8$ indicate hydrogen, phenyl group, alkyl group or hydrocarbon compounds containing cyclo rings, or alternatively, $B^n$ to $B^{n+1}$ may be linked with $C_6H_4$ in a ring form, n being 1, 3, 5 or 7, and M denotes two to four protons or a metal atom, and having a thickness dimension d, and having a complex index of refraction including a real part and an imaginary part and a reflective layer on said optical recording layer;

recording information on said optical recording medium by contacting the optical recording medium with blue-hued laser light having a first recording wavelength, $\lambda_1$, to provide an information carrying optical recording medium, which when reproduced on a compact disc reproducing apparatus has a modulation factor of 0.6 or higher; and thereafter playing back information stored on the information carrying optical recording medium by contacting the information carrying optical recording medium with laser light having a second, higher, replay wavelength, $\lambda_2$, the optical recording layer being formed on the substrate so that the real part of the complex index of refraction in the replay light wavelength, $\lambda_2$, is 2.55 or higher and the absolute value of the imaginary part of the complex index of refraction at $\lambda_2$ is 0.1 or lower; and such that the absolute value of the imaginary part of the complex index of refraction at $\lambda_1$ is 1.0 or higher; and wherein the dimension d is less than or equal to 1.75 $\lambda_2/n$, wherein n is the real part of the complex index of refraction of the recording layer at $\lambda_2$.

2. A method as defined in claim 1, wherein the substrate comprises a material selected from glass, polycarbonate and polyethylene terephthalate.

3. A method as defined in claim 1, wherein the organic dye is a zinc-tetraphenyl tetrabenzo porphine complex.

4. A method as defined in claim 1, wherein the reflective layer is selected from aluminum deposited films and gold deposited films.

* * * * *